United States Patent [19]

Kawaguchi

[11] Patent Number: 4,899,613

[45] Date of Patent: Feb. 13, 1990

[54] STEERING WHEEL ASSEMBLY WITH AN AIR BAG UNIT

[75] Inventor: Masaaki Kawaguchi, Saitama, Japan

[73] Assignee: Honda Giken Kogyo Kabushiki Kaisha, Tokyo, Japan

[21] Appl. No.: 20,486

[22] Filed: Mar. 2, 1987

[30] Foreign Application Priority Data

Feb. 28, 1986 [JP] Japan .................................. 61-44771

[51] Int. Cl.$^4$ .......................... B62D 1/04; B60R 21/16
[52] U.S. Cl. ...................................... 74/552; 280/731
[58] Field of Search .................. 74/552; 280/731, 750, 280/777, 778; 29/159 B

[56] References Cited

U.S. PATENT DOCUMENTS

| | | | |
|---|---|---|---|
| 3,310,597 | 10/1975 | Seko | 74/552 |
| 3,674,284 | 7/1972 | Lohr | 280/731 |
| 3,680,884 | 8/1972 | Stephenson | 280/731 |
| 3,714,844 | 2/1973 | Tsuda | 74/552 |
| 3,744,817 | 7/1973 | Ousset | 280/731 |
| 3,801,123 | 4/1974 | Jira | 280/731 |
| 3,819,205 | 6/1974 | Dunford et al. | 280/731 |
| 3,843,152 | 10/1974 | Nonaka | 280/731 |
| 3,895,823 | 7/1975 | Stephenson | 280/731 |
| 4,013,305 | 3/1977 | Ichihara | 280/731 |
| 4,148,503 | 4/1979 | Shiratori et al. | 280/731 |
| 4,275,901 | 6/1981 | Okada | 280/731 |
| 4,325,568 | 4/1982 | Clark et al. | 280/731 |

FOREIGN PATENT DOCUMENTS

| | | | |
|---|---|---|---|
| 3145731 | 5/1983 | Fed. Rep. of Germany | 280/731 |
| 0066043 | 4/1982 | Japan | 280/731 |
| 0234781 | 10/1987 | Japan | 74/552 |
| 2096410 | 10/1982 | United Kingdom | 280/731 |

Primary Examiner—Vinh T. Luong
Attorney, Agent, or Firm—Lyon & Lyon

[57] ABSTRACT

A steering wheel assembly with an air bag unit, which comprises a hub releasably secured onto a steering shaft, one or more connecting members attached to the hub, a steering wheel connected to the hub by the one or more connecting members, the air bag unit including a casing substantially centrally arranged on the hub, a gas generator mounted in the casing and having a squib protecting substantially centrally downwardly from its lower surface, an air bag attached to the casing and communicating with the gas generator, the air bag being inflated by gas fed from the gas generator, and a cover adapted to cover the casing. Each of the gas generator and the squib has a central axis offset from an axis of rotation of the steering shaft, and the steering wheel has a center of gravity diametrically opposite to a center of gravity of the gas generator with respect to the axis of rotation of said steering shaft.

6 Claims, 4 Drawing Sheets

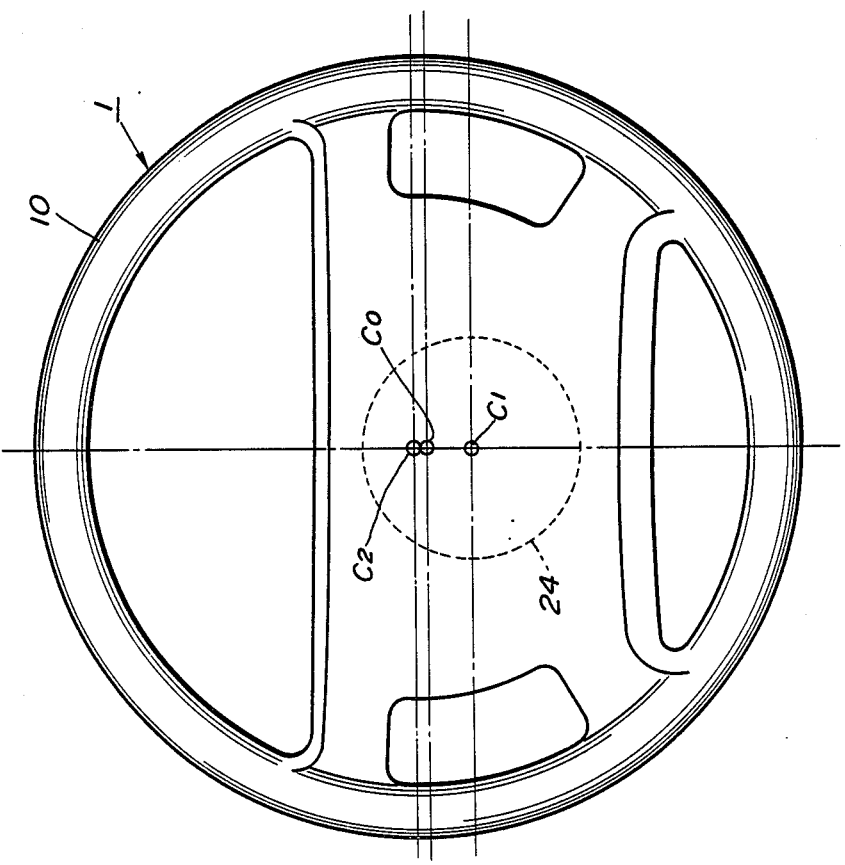
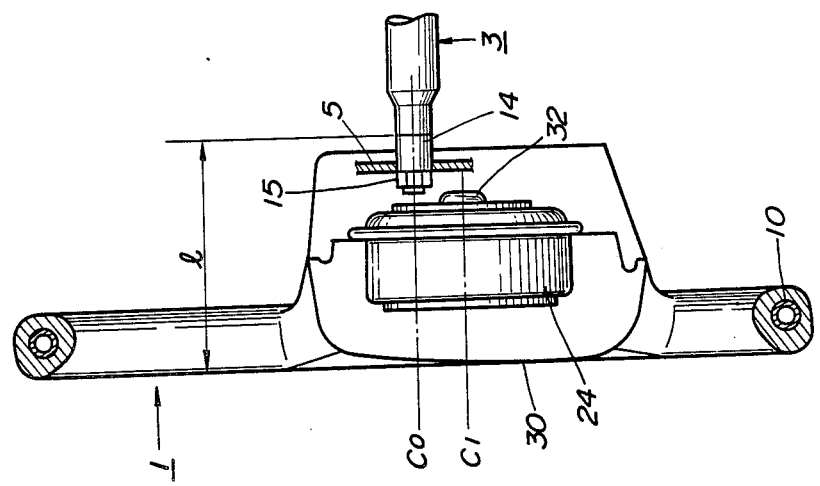

STEERING WHEEL ASSEMBLY WITH AN AIR BAG UNIT

BACKGROUND OF THE INVENTION

1. Field of the Invention

The present invention relates to a steering wheel assembly with an air bag unit.

2. Description of the Related Art

It has recently been proposed to equip a steering wheel assembly with an air bag unit in an effort to protect the driver of a vehicle during an accident. In a typical air bag unit, an air bag is inflated by gas under high pressure fed from a gas generator to avoid or minimize shacks to the driver.

In a conventional steering wheel assembly with an air bag unit, the central axis of a gas generator is in alignment with the axis of rotation of a steering shaft. The gas generator has a squib projecting centrally downwardly from its lower surface and facing the upper end of the steering shaft. This arrangement, however, prevents to reduce the axial length of the entire steering wheel assembly.

SUMMARY OF THE INVENTION

Therefore, it is an object of the present invention to provide a steering wheel assembly with an air bag unit, which can reduce the axial length of the entire steering wheel assembly and which is compact in structure.

It is another object of the invention to provide a steering wheel assembly, which provides reliable steerability by restraining moment of inertia about the center of rotation of a steering wheel assembly According to a first embodiment of the invention, there is provided a steering wheel assembly with an air bag unit, comprising a hub releasably secured onto a steering shaft, one or more connecting members attached to the hub, a steering wheel connected to the hub by the one or more connecting members and the air bag unit including a casing substantially centrally arranged on the hub, a gas generator substantially centrally placed in the casing and having a squib projecting substantially centrally downwardly from its lower surface, an air bag attached to the casing and communicating with the gas generator, said air bag being inflated by gas fed from the gas generator, and a cover adapted to cover the casing. With this arrangement, each of the gas generator and the squib has a central axis which is offset downwardly from an axis of rotation of the steering shaft when the steering wheel is in its initial or neutral position. Therefore, the axial length of the entire steering wheel assembly can be reduced by the length of the squib.

According to a second embodiment of the invention, there is provided a steering wheel assembly with an air bag unit, comprising a hub releasably secured onto a steering shaft, one or more connecting members attached to the hub, a steering wheel connected to the hub by the one or more connecting members, the air bag unit including a casing substantially centrally arranged on the hub, a gas generator placed substantially centrally in the casing and having a squib projecting substantially centrally downwardly from its lower surface, an air bag attached to the casing and communicating with the gas generator, the air bag being inflated by gas fed from the gas generator, and a cover adapted to cover the casing. Each of the gas generator and the squib has a central axis offset from an axis of rotation of the steering shaft, and the steering wheel has a center of gravity diametrically opposite to that of the gas generator with respect to the axis of rotation of the steering shaft.

The above and further objects, features, and advantages of the present invention will become more apparent from the following description when taken in conjunction with the accompanying drawings.

BRIEF DESCRIPTION OF THE DRAWINGS

FIG. 4 is a schematic side view of a steering wheel assembly with an air bag unit according to a first embodiment of the invention; and FIG. 5 is a schematic plan view of a steering wheel assembly with an air bag unit according to a second embodiment of the invention.

DESCRIPTION OF THE PREFERRED EMBODIMENTS

Figure 1:
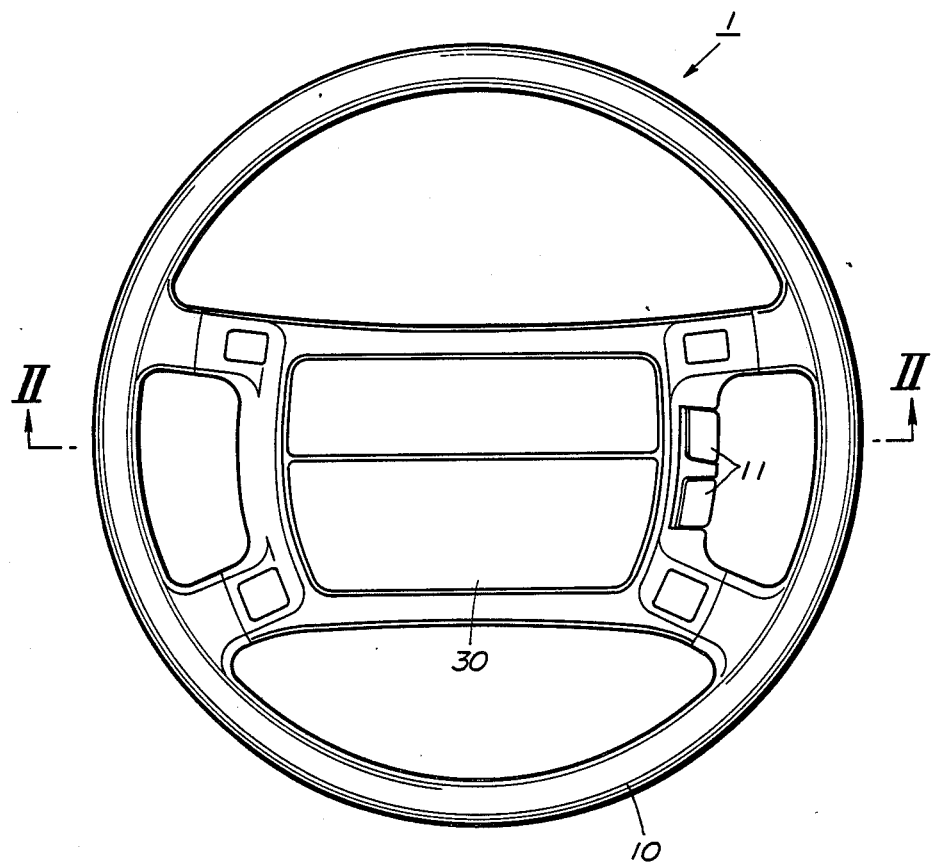
FIG. 1 is a plan view of a prior art steering wheel assembly with an air bag unit.
Figure 2:
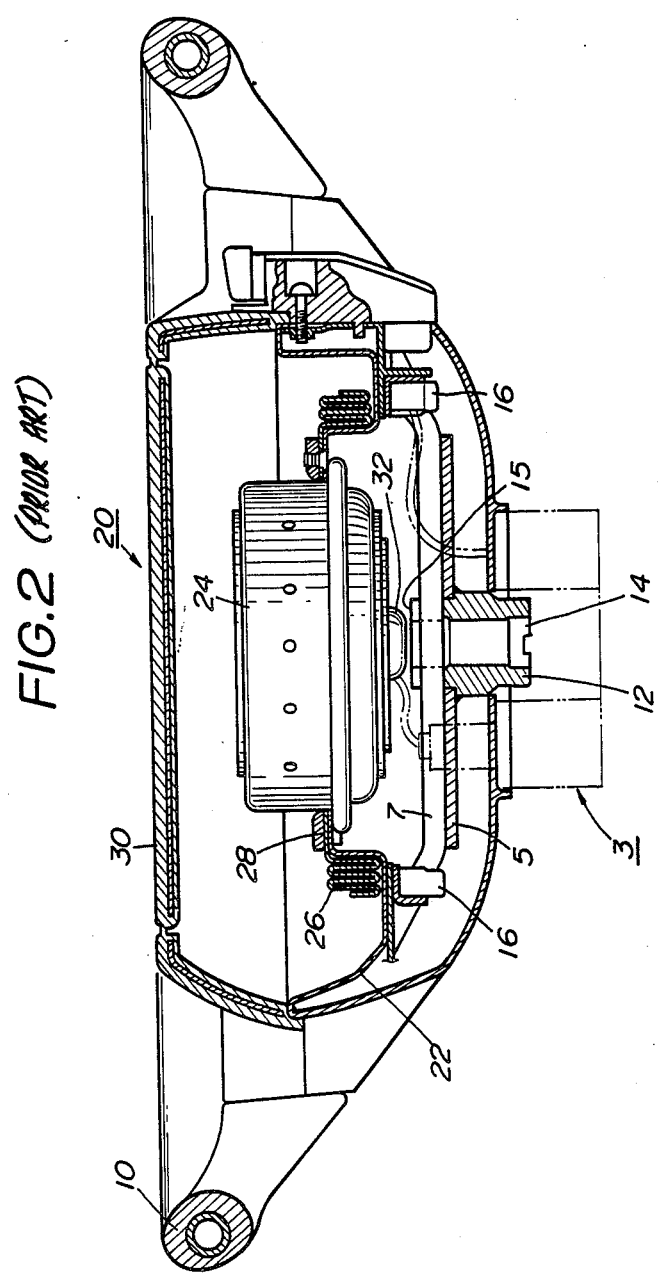
FIG. 2 is a sectional view taken along the line II—II of FIG. 1.
Figure 3:
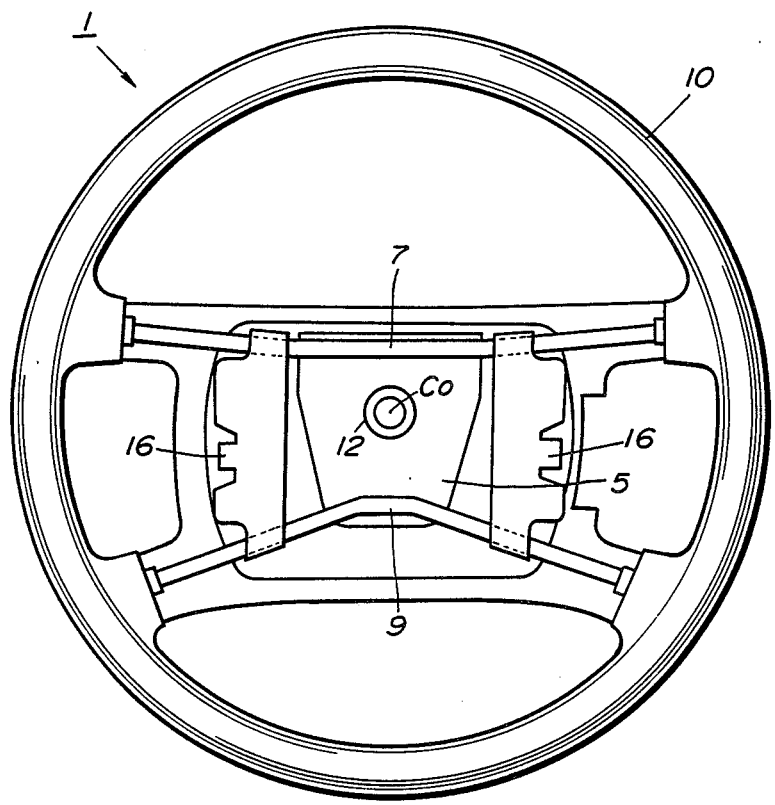
FIG. 3 is a view similar to FIG. 1, but with a cover removed to show the details of the steering wheel assembly shown in FIG. 1.

With reference to FIGS. 1 to 3, there is illustrated a prior art steering wheel assembly 1 generally including a hub 5 releasably secured on a steering shaft 14 of a steering column assembly 3 (FIG. 4), upper and lower connecting member or spokes 7, 9 attached to the hub 5, and a steering wheel 10 connected to the hub 5 by the spokes 7, 9. As best seen in FIG. 2, the steering wheel 10 is positioned upwardly of the hub 5 in the axial direction of the steering wheel assembly 1. The hub 5 has on its lower surface a fixed pivot pipe 12 into which a splined upper end of the steering shaft 14 is inserted and secured by means of a bolt 15. Stays 16, 16 are fixed to opposite ends of the spokes 7, 9. Reference numeral 11 designates a combination switch for cruise control.

With continuing reference to FIG. 2, an air bag unit, generally designated at 20, is supported by the steys 16, 16 and includes a casing 22, arranged substantially centrally in the steering wheel assembly 1, a gas generator 24 mounted substantially at the center of the casing 22 and has a squib 32 projecting substantially centrally downwardly from its lower surface, an inflatable air bag 26 attached by any suitable means, for example, by rivets 28, to the casing 22 and normally held in a folded condition, and a cover 30 made of synthetic resin and adapted to cover the casing 22. With this arrangement, operation of the squib 32 causes the gas generator 24 to feed gas under high pressure to the interior of the air bag 25. The air bag 26 is thereby inflated to break the upper part of the cover 30 and is fully inflated in front of the driver of the vehicle for protecting purposes.

FIG. 4 illustrates a first embodiment of the invention wherein reference numerals C0 and C1 are a center of rotation of the steering shaft 14 and a central axis of each of the gas generator 24 and the squib 32, respectively. As is clear from FIG. 4, the central axis C1 of each of the gas generator 24 and the squib 32 is offset downwardly from the center C0 of rotation of the steering shaft 14 of the steering column assembly 3 when the steering wheel 10 is in its initial or neutral position as shown in FIGS. 1 and 3. As is clear from FIG. 4, which arrangement allows a reduction in the axial length of the steering wheel assembly 1 by the axial length of the squib 32.

According to a second embodiment of the invention, as shown in FIG. 5, a center C2 of gravity of the steering wheel 10 is diametrically opposite to a center of gravity or the central axis C1 of the gas generator 24 with respect to the center C0 of rotation of the steering shaft 14. It should be mentioned that the center C2 of gravity of the steering wheel 10 may be a center of the steering wheel 10. In the illustrated embodiment, when the steering wheel 10 is in its initial or neutral position, the center of gravity of the gas generator 24 is offset downwardly from the axis of rotation of the steering shaft 14, and the center or the center C2 of gravity of the steering wheel 10 is offset upwardly from the axis of rotation of the steering shaft 14. This arrangement provides lesser displacement of the center of gravity in the entire steering wheel assembly 1. Thus, moment of inertia about the axis of rotation of the steering wheel assembly 1 is minimized to a full extent, and highly reliable steerability is obtained.

It will be apparent to one skilled in the art that various changes and modifications can easily be made in the invention without departing from the scope of the invention as defined by the appended claims.

What is claimed is:

1. A steering wheel assembly with an air bag unit, comprising,
   a hub releasably secured onto a steering shaft;
   at least one connecting member attached to said hub;
   a steering wheel connected to said hub by said at least one connecting member; and
   said air bag unit including a casing on said hub, a gas generator mounted in said casing and having a squib projecting substantially centrally downwardly from its lower surface, an air bag attached to said casing and communicating with said gas generator, said air bag being inflated by gas under pressure fed from said gas generator, and a cover adapted to cover said casing,
   said gas generator and said squib having central axes axially offset from an axis of rotation of said steering shaft.

2. A steering wheel assembly with an air bag unit according to claim 1, wherein said central axis of each of said gas generator and said squib is offset downwardly from said axis of rotation of the steering shaft when said steering wheel is in its initial or neutral position.

3. A steering wheel assembly with an air bag unit according to claim 1, wherein said steering wheel has a center of gravity diametrically opposite to a center of gravity of said gas generator with respect to said axis of rotation of said steering shaft.

4. A steering wheel assembly with an air bag unit according to claim 3, wherein when said steering wheel is in its initial or neutral position, said center of gravity of said gas generator is offset downwardly from said axis of rotation of the steering shaft, and said center of gravity of said steering shaft is offset upwardly from said axis of rotation of said steering shaft.

5. A steering wheel assembly with an air bag unit according to claim 1, wherein said steering wheel has a center diametrically opposite to a center of said gas generator with respect to said axis of rotation of said steering shaft.

6. A steering wheel assembly with an air bag unit according to claim 5, wherein when said steering wheel is in its initial or neutral position, said center of said gas generator is offset downwardly from said axis of rotation of the steering shaft, and said center of said steering shaft is offset upwardly from said axis of rotation of said steering shaft.

* * * * *